(12) United States Patent
Funke

(10) Patent No.: US 6,517,311 B2
(45) Date of Patent: Feb. 11, 2003

(54) TURBO-COMPRESSOR

(75) Inventor: Richard Funke, Köln (DE)

(73) Assignee: Atlas Copco Energas GmbH, Köln (DE)

(*) Notice: Subject to any disclaimer, the term of this patent is extended or adjusted under 35 U.S.C. 154(b) by 19 days.

(21) Appl. No.: 09/741,325

(22) Filed: Dec. 20, 2000

(65) Prior Publication Data

US 2001/0022940 A1 Sep. 20, 2001

(30) Foreign Application Priority Data

Jan. 25, 2000 (DE) .......................................... 100 03 018

(51) Int. Cl.$^7$ ................................................ F01D 3/00
(52) U.S. Cl. ........................ 415/106; 415/104; 415/105; 417/365; 74/801
(58) Field of Search ................................ 415/144, 106, 415/107, 104, 122.1; 417/365

(56) References Cited

U.S. PATENT DOCUMENTS

| | | | |
|---|---|---|---|
| 1,385,115 A | * | 7/1921 | Cone ........................... 415/106 |
| 3,664,758 A | * | 5/1972 | Sato ............................ 415/104 |
| 4,610,182 A | * | 9/1986 | Heidrich ....................... 74/801 |
| 4,688,989 A | * | 8/1987 | Kondo et al. ............. 415/122.1 |
| 4,822,240 A | * | 4/1989 | Marshall ...................... 415/105 |
| RE33,142 E | * | 1/1990 | Sato et al. ................... 417/365 |
| 5,154,587 A | * | 10/1992 | Mori et al. .................. 415/104 |
| 5,312,225 A | * | 5/1994 | Lorenzen ..................... 415/104 |
| 5,312,226 A | * | 5/1994 | Miura et al. ................. 415/106 |
| 5,382,132 A | * | 1/1995 | Mendel .................... 415/122.1 |
| 5,531,564 A | * | 7/1996 | Anttonen et al. ........... 415/104 |
| 6,036,435 A | * | 3/2000 | Okleja ......................... 415/106 |
| 6,068,444 A | * | 5/2000 | Sheth .......................... 415/104 |
| 6,318,958 B1 | * | 11/2001 | Giesler et al. ........... 415/122.1 |

FOREIGN PATENT DOCUMENTS

EP 0 008 616 6/1979

* cited by examiner

Primary Examiner—Thomas Denion
Assistant Examiner—Thai-Ba Trieu
(74) Attorney, Agent, or Firm—Collard & Roe, P.C.

(57) ABSTRACT

A turbo-compressor having a housing and at least one rotor shaft pivotably supported in the housing, with a free shaft end and with a rotor connected with the other end of the rotor shaft. The free end of the rotor shaft facing away from the rotor projects into a pressure chamber connected with the housing, and is acted upon by a pressurized fluid whose force of pressure compensates for the force of the axial thrust acting on the rotor. Thus, the starting friction of the compressor is lower and drive motors of lower output target can be utilized.

5 Claims, 1 Drawing Sheet

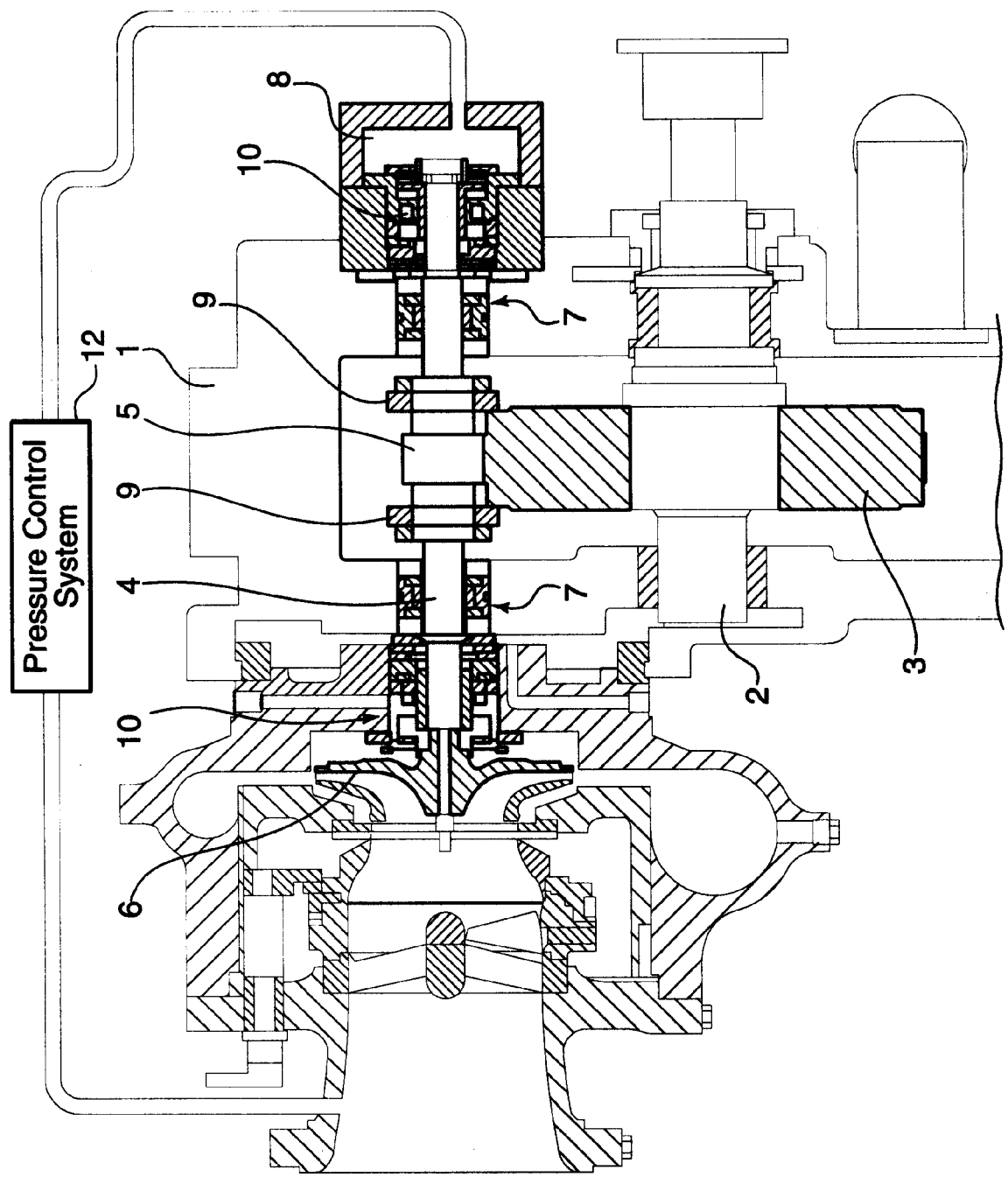

TURBO-COMPRESSOR

BACKGROUND OF THE INVENTION

1. Field of the Invention

This invention relates to a turbo-compressor that has a housing and at least one rotor shaft supported in the housing. The rotor shaft has one free end, and a rotor connected to the other end. The rotor shaft is supported in the housing, for example in hydraulic or magnetic bearings, and preferably driven about its center, whereby it is possible to use high rom drives or other drive motors. The compressor can also be provided as a geared turbo-compressor that has a drive shaft with a toothed drive gear, and at least one rotor shaft driven by the drive gear. The drive shaft and the rotor shaft are pivotably supported in the gear housing the turbo-compressor. The rotor shaft has a rotor that is supported in an overhung manner.

2. The Prior Art

Due to the axial pressure differences occurring on the rotor, an axial thrust acts on the rotor shaft. Within the framework of known measures, this axial thrust is absorbed by a hydraulic axial bearing (see for example European Patent 0 008 616). In practical applications, the hydraulic axial bearing is often designed in the form of an axial, tilting segmented pressure bearing. The starting moment of the hydraulic axial bearing, which has to be overcome when the turbo-supercharger is started, is considerably high. For example, the high static friction of the stator has to be overcome first. The component of liquid friction occurring within the zone of mixed friction increases with the increase in peripheral speed, and the friction decreases to a minimum. As the number of revolutions increases further, the friction in the zone of liquid friction rises again, so that noticeable friction losses occur even at the rated rotational speed. These frictional losses are converted into heat that has to be dissipated by cooling. Moreover, a complicated and costly oil system with circulation is required to supply the hydraulic axial bearing.

SUMMARY OF THE INVENTION

The present invention provides an improved turbo-compressor with the structure described above, that effectively compensates for the axial thrust with the lowest possible loss, both during start-up and at the rated rotational speed.

To solve this problem, the invention provides that the free end of the rotor shaft, facing away from the rotor, projects into a pressure chamber connected with the housing, so that the free end of the shaft is acted upon by a pressurized fluid. The pressure exerted by the fluid acting on the free end of the rotor shaft compensates for the axial thrust acting on the rotor. The initial pressure acting on the rotor and the pressure of the fluid in the pressure chamber mounted on the free end of the shaft are balanced by means of control technology so as to completely compensate for the axial force acting on the rotor. An axial bearing supported on the housing, such as a hydrostatic sliding bearing is thus no longer required, even if the turbo-compressor is employed, for compressing fluids with high initial pressure. The structure of the gearing and the rotor housing are simplified due to the fact that a hydrostatic slide bearing is eliminated.

To guide the rotor shaft axially, butt rings or collars are preferably arranged on both sides of a driven section of the rotor shaft, the butt rings cooperating with the driving means to limit the axial thrust. In conjunction with a geared turbo-compressor, the butt rings are arranged on both sides of a pinion connected with the rotor shaft, and preferably have cooperating sliding rings to limit the axial thrust by engaging annular surfaces of a toothed drive gear mating with the pinion. This arrangement is possible since no high axial forces are transmitted.

The shaft passages at both ends of the rotor shaft need to be sealed. The shaft passage located at the free end of the rotor shaft preferably has a seal arrangement comprising at least one slide ring or similar seal to seal the pressure chamber. Particularly suitable is a seal arrangement comprising two sliding ring seals arranged one after the other, or similar seals, whereby a blocking medium or fluid can be admitted into the space between the seals. The same type of seal arrangement is recommended also to seal the shaft passage located at the front shaft end associated with the rotor. The shaft passages leading to the rotor and to the pressure chamber are preferably equipped with identical seal arrangements, which simplifies the stockkeeping of spare parts. The rotor shaft is preferably supported on radial slide bearings mounted within the housing.

BRIEF DESCRIPTION OF THE DRAWINGS

Other objects and features of the present invention will become apparent from the following detailed description considered in connection with the accompanying drawing which discloses the embodiments of the present invention. It should be understood, however, that the drawing is designed for the purpose of illustration only, and not as a definition of the limits of the invention.

The figure schematically shows a cross sectional view through a turbo-compressor of the invention.

DETAILED DESCRIPTION OF THE PREFERRED EMBODIMENT

The turbo-compressor shown in the figure is a single-stage radial compressor having the type of construction of a geared turbo-supercharger. The basic structure of the turbo-compressor comprises a housing 1, a drive shaft 2 with a toothed drive gear 3, a rotor shaft 4 with a pinion 5, and a rotor 6 supported in a rotational manner, and connected to one end of rotor shaft 4. Driving shaft 2 and rotor shaft 4 are supported in housing 1 spaced apart on radial slide bearings 7. Toothed drive gear 3 mates with the teeth of pinion 5.

The free end of the rotor shaft, facing away from the rotor 6, projects into a pressure chamber 8 that is connected with housing 1. At its face side, the free end is acted upon by a pressurized fluid. The force of the pressure exerted by the fluid on the free end of rotor shaft 4 compensates for the axial force of thrust acting on the rotor shaft 4 due to pressure differences on rotor 6. The pressure of the fluid adjusted in pressure chamber 8 is coordinated with the initial pressure prevailing on rotor 6 with available means of pressure control system 12 so that the opposed axial forces acting on the two ends of rotor shaft 4 cancel each other.

To guide rotor shaft 4 axially, butt rings or collars are preferably provided with sliding rings 9 disposed on both sides of pinion 5. These butt rings cooperate with annular surfaces of toothed drive gear 3 to limit the axial thrust. The annular surfaces of gear 3 are formed on each side of the toothed surface, adjacent to the periphery of the gear.

The shaft passage way or bearing at the rearward end of the rotor shaft 4 is provided with a seal. In the embodiment shown, the seal arrangement 10 consists of two sliding ring seals disposed one after the other, whereby a blocking medium or fluid can admitted into the space between the sliding ring seals. An identical or similar seal arrangement 10 is provided for the shaft passage leading to rotor 8 as well. The stockkeeping of spare parts is simplified if the seal arrangements 10 located at the two rotor shaft ends are identical.

The arrangement of the invention effectively compensates for the axial thrust both when the turbo-compressor is started and when its rated rotational speed is reached. This arrangement is particularly suited for single-stage, geared turbo-compressors. Furthermore, it can be used for geared turbo-compressors with a plurality of rotor shafts that each support only one rotor. The arrangement as defined by the invention is applicable when high initial pressure is applied to rotor 6. With a high initial pressure of the fluid to be compressed, the starting friction or break-loose moment of rotor shaft 4 is low. Furthermore, the embodiment of the invention has relatively low energy losses once rotor shaft 4 has reached its rated rotational speed. Thus, drive motors with lower output torque can be employed as a result.

Accordingly, while a few embodiments of the present invention have been shown and described, it is to be understood that many changes and modifications may be made thereunto without departing from the spirit and scope of the invention as defined in the appended claims.

What is claimed is:

1. A turbo-compressor comprising a housing (1);
   at least one rotor shaft (4) pivotably supported in the housing and having a free shaft end;
   a rotor (6) connected to the other end of said rotor shaft (4);
   a pressure chamber (8) connected to said housing (1) for covering the free shaft end and for containing a pressurized fluid, the free shaft end being acted upon by the pressurized fluid, whose force of pressure compensates the force of the axial thrust acting on said rotor (6); and
   a seal arrangement (10) having at least one sliding ring seal for sealing said pressure chamber (8), and defining a shaft passage way located at the free end of said rotor shaft (4), said seal arrangement (10) comprising two sliding ring seals disposed one after the other, and a blocking medium disposed in between said sliding ring seals.

2. The turbo-compressor according to claim 1, wherein said rotor shaft (4) comprises a driven section disposed between its ends, and butt rings disposed on both sides of the driven section of said rotor shaft (4), said butt rings cooperating with the driving means to limit the force of the axial thrust.

3. The turbo-compressor according to claim 2, wherein said driven section of said rotor shaft (4) comprises a pinion, and a toothed driving gear (3) having opposed annular surfaces and meeting with said pinion (5), wherein said butt rings are arranged on both sides of said pinion and have cooperating sliding rings for limiting the axial thrust with the annular surfaces of said drive gear (3).

4. The turbo-compressor according to claim 1, wherein the shaft passage leading to said rotor (6) and the shaft passage leading to said pressure chamber (8) are equipped with identical seal arrangements (10).

5. The turbo-compressor according to claim 1, wherein said rotor shaft (4) further comprises radial slide bearings (7) for pivotably supporting said shaft (4) within said housing (1).

* * * * *